April 24, 1945.  W. NICHOLAS  2,374,230
INCENDIARY MISSILE
Filed April 23, 1943

Inventor
William Nicholas
By C.E. Herrstrom & H.E. Thibodeau
Attorneys

Patented Apr. 24, 1945

2,374,230

UNITED STATES PATENT OFFICE 2,374,230

INCENDIARY MISSILE

William Nicholas, Chicago, Ill.

Application April 23, 1943, Serial No. 484,170

7 Claims. (Cl. 102—65)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to incendiary missiles of the type thrown by hand or by machine, at an objective for the purpose of starting combustion thereat. The object of the invention is to provide a missile of the type described which will be simple and inexpensive to produce in large quantities, which will be effective both in ignition upon hitting the objective and in causing and maintaining combustion thereat, and which will be especially adaptable for hand propulsion. For the attainment of these and such other objects as may appear or be pointed out herein, I have shown one embodiment of my invention in the accompanying drawing, wherein:

Figure 1:
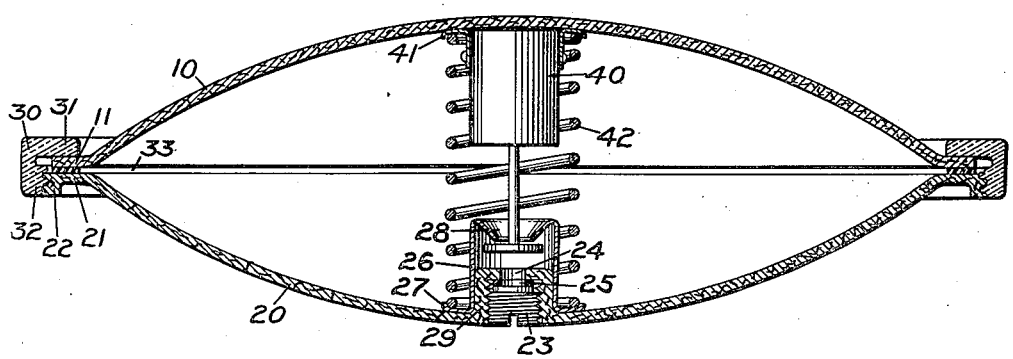
Fig. 1 is a section through the improved missile.

The missile is comprised of two oppositely dished members, upper member 10 and lower member 20, fabricated of plastic or other material preferably inflammable, such as pyroxylin, Celluloid, impregnated cardboard or treated paper, fibre, etc. The two half members 10, 20 are held firmly together by means of a ring member 30 generally of L-shape in section to present a flange 31 and a threaded web 32. In assembling the parts, the flat (i. e., undished) edge portion 11 of upper half member 10 is placed in ring member 30 to rest against its flange 31. The edge of the corresponding flat portion 21 of the lower half member 20 is provided with a down-turned lip 22 which is threaded to be screwed into the threaded web 32 of the ring member 30. A rubber gasket 33 is interposed between the flat edge portions 11 of the upper half 10 and the flat portions 21 of the lower half 20, and the lower half 20 screwed into ring member 30 to provide a liquid tight seal between the two halves.

Ring member 30 is made of frangible material such as glass, porcelain, lava, etc., which will readily break upon contact or upon receiving a sharp blow.

The space defined by the two opposite halves of the missile is filled with an inflammable liquid, such as gasoline, oil, inflammable carbon compounds, etc., or any desirable mixture of such substances. For the purpose of filling the missile with combustible liquid—of course after the two halves have been sealed together—as described— one of the two valves, the lower one as shown in Fig. 1, is provided with an inwardly directed boss 29 tapped to receive a screw plug 23 having a screw-driver slot; the seat of tapped boss 29 is pierced by a port hole 24 communicating with the interior space of the missile. A rubber gasket 25 is interposed between the seat of the tapped boss and the screw plug 23 to ensure a liquid tight seal.

Any suitable mechanism may be provided for igniting the inflammable liquid released upon fracture of the missile upon hitting its objective. I have found the following ignition mechanism satisfactory. An ignition cylinder 40, preferably made of inflammable material similar to that of the two halves 10 and 20 of the missile, and generally of cylindrical shape with open ends, is centrally positioned in the missile, see Fig. 1, between the two complementary halves. A coil spring 42 is compressed in position between the two assembled missile halves; one of the functions served by spring 42 is to hold the ignition cylinder 40 in central position. For this purpose, one end of cylinder 40 is provided with a flange member 41 cupped as shown in Fig. 1 to seat one end of coil spring 42. The other end of the spring coil is anchored about the boss 29. It is understood that when the two halves 10, 20 are assembled (as already described) the spring 42 is under sufficient compression to securely hold ignition cylinder 40 in place.

Figure 3:
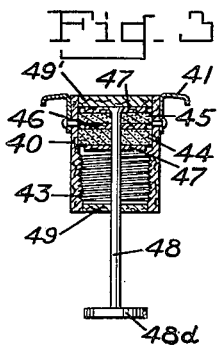
Fig. 3 is a section through the friction igniter of the missile.

The interior of cylinder 40 is roughened to provide an ignition surface; conveniently this may be done, as shown in Fig. 3, by merely tapping (43) one end of the cylinder. Cooperative with roughened surface 43 is an ignition piston comprising a disc 44 of highly combustible or pyrophoric material and a disc 45 of a suitable oxidizing agent. The two discs 44 and 45 are separated by partition 46, the whole piston being held together between end pieces 47 and secured on piston rod 48. The ends of the cylinder are closed by end plates 49' and 49, the end plate 49 having a hole for piston rod 48; preferably, the end plates 49 and 49' are made of combustible material similar to that of the missile halves 10, 20 and ignition cylinder 40, and are sealed tightly in the cylinder ends to prevent admittance of air therein.

The end of piston rod 48 projecting through the cylinder end plate 49 is provided with a dog disc 48d. A stop member 26 in the form of a short tube of inside diameter such that it may be inserted over the boss 29, as clearly seen in Fig. 1. One end of tubular member 26 is flanged outwardly (27) to provide a seat for one end of compression spring 42, the other end of the coil spring being seated in the flange 41 of ignition cylinder 40, as already described. The other end of tubular member 26 is flanged inwardly (28) to provide a stop for dog disc 48d of the ignition rod.

Compression spring 42 not only serves to hold the ignition cylinder 40 and the stop member 26 securely in place, but further serves to actuate the ignition piston 44, 45. When the parts are assembled for field service, the ignition device is installed within the missile, with its piston 44, 45 in rearmost position (as shown in Fig. 3), the piston being held there by reason of its friction fit in the cylinder. In this position of the piston, its dog disc 48d is in underlying relation to the stop flange 28, as clearly shown in Fig. 1. Upon impact with the objective, the frangible ring member 30 is fractured and fragmented, thus suddenly releasing compressed coil spring 42 and causing the two missile halves 10, 20 to open up. As spring 42 is relieved from compressive restraint, the ignition cylinder moves outwardly until dog disc 48d contacts, and is held firmly by, stop flange 28. The sudden release of compression of coil spring 42 will cause the ignition cylinder seals to break, especially at end plate 49, and continued motion of the ignition cylinder (with missile half 10) relative to the ignition piston moving in the opposite direction (with missile half 20) will cause, by frictional rubbing of pyrophoric disc 44 and oxidizing disc 45 across the roughened (tapped) interior 43 of the cylinder, sudden ignition of the inflammable fluid and also of the other combustible material, such as 10, 20, 40 etc.

Figure 2:
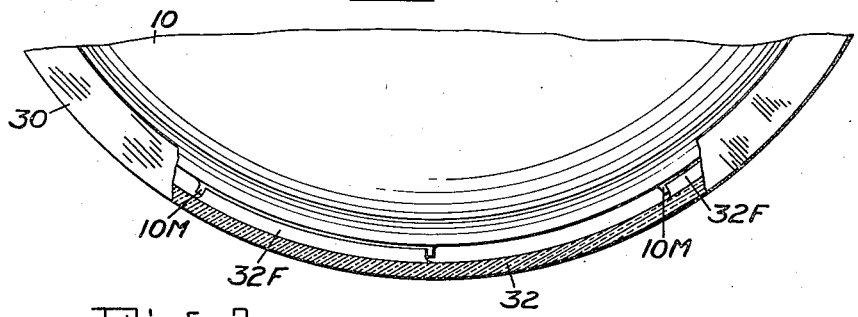
Fig. 2 is a top view of a portion of the missile, with a part in section.

Because of the fact that ring member 30 is made of glass or similar frangible material, the threads 32, 22 are preferably of the rounded type known as lamp socket screw threads. In order that the parts may be assembled or screwed together so that tension is equally applied around the ring member 30, the threads 32, 22 are of the so-called interrupted type. The circumference defined between the external or male threads of lower missile half 20 and the internal or female threads of ring member 30, is divided into a number of equal segments. Alternate ones of the equal segments present internal or female threads of the ring member 30, designated 32F in Fig. 2, and external or male threads 10M of the lower half missile member 10. In assembling the parts the lower missile half is fitted in the ring member 30 with its interrupted or segmental threads 10M clearing in the segment spaces between the complementary threaded segments 32F of the ring member. The two members are squeezed firmly together (to compress rubber gasket 33) before they are turned a small angle relatively to each other to engage the threads and lock the missile together.

When projected by hand, the novel incendiary missile is handled in the manner of a discus; the circular motion imparted to it serves to maintain stability in flight and its flat shape tends to offer less air resistance in flight.

I claim:

1. An incendiary missile comprising a body formed of two dish shaped halves, frangible means connecting said halves at their edges and adapted to break upon impact of the body, an ignitable charge in said body, means within the body normally tending to separate said halves, ignition means carried jointly by the halves and operating, upon the separation of the said halves, to ignite the charge.

2. An incendiary missile comprising a body formed of two dish shaped halves, a ring of frangible material connecting said halves at their edges and adapted to break upon impact of said body, an ignitable charge within said body, a prestressed spring within the body tending to separate said halves, and ignition means within the body and carried jointly by said halves and operating, upon the separation of said halves, to ignite the charge.

3. An incendiary missile comprising two dish shaped halves, an ignitable charge in said body, frangible means connecting said halves at their edges and adapted to break upon the impact of said body, a cylinder of inflammable material carried by one of the halves, friction ignition means in said cylinder operating to ignite said cylinder and thereby the ignitable charge, means carried by the other half of the body cooperating with said friction ignition means upon the separation of the halves to ignite the said charge, and a prestressed spring interposed between the halves to separate them upon the breaking of said frangible means.

4. An incendiary missile, comprising a body formed of two dish shaped halves, an incendiary charge in said body, frangible means joining said halves at their edges and adapted to break upon impact of said body, a cylinder of inflammable material carried by one of the halves and having an internal friction surface, a piston of friction primer material in the cylinder and arranged to engage said frictional surface upon the separation of the halves, a stop carried by the other of the halves, a device carried by the piston and anchoring it to said stop, and a prestressed spring interposed between the halves and operating to separate them upon the breaking of the frangible means, said stop operating to cause the piston to engage the inflammable material in the cylinder upon the separation of the halves and ignite said cylinder, and thereby the incendiary charge.

5. An incendiary missile comprising an elliptical hollow body formed of opposed halves, an incendiary charge in said body, frangible means connecting the peripheral edges of the halves and adapted to break upon impact of said body, ignition means in the body carried jointly by said halves and operable to ignite the charge upon separation of the halves, and prestressed spring means within the body and adapted to forcefully separate the halves upon the breakage of said frangible means.

6. The invention of claim 1 characterized in that the dish shaped halves are of inflammable material.

7. An incendiary missile comprising a hollow body formed of two opposed dish shaped sections, said body adapted to receive an ignitable charge, frangible means joining said sections at their peripheral edges and adapted to break upon impact of the missile, spring means within the body for forcefully separating the sections upon breakage of said frangible means, and ignition means in said body operable upon the separation of the sections for igniting the charge within the body.

WILLIAM NICHOLAS.